United States Patent [19]

Inoue

[11] Patent Number: 4,508,604
[45] Date of Patent: Apr. 2, 1985

[54] TRAVELING-WIRE EDM METHOD

[75] Inventor: Kiyoshi Inoue, Tokyo, Japan

[73] Assignee: Inoue-Japax Research Incorporated, Yokohama, Japan

[21] Appl. No.: 476,522

[22] Filed: Mar. 18, 1983

[30] Foreign Application Priority Data

Mar. 28, 1982 [JP] Japan .................. 57-48442

[51] Int. Cl.³ .................. C25F 3/02; B23P 1/12
[52] U.S. Cl. .................. 204/129.5; 204/206; 204/224 M; 219/69 E; 219/69 W
[58] Field of Search .............. 204/129.5, 224 M, 206, 204/290 R; 427/119; 219/69 E, 69 W

[56] References Cited

U.S. PATENT DOCUMENTS

| | | | |
|---|---|---|---|
| 2,715,172 | 8/1955 | Larkins, Jr. ................. | 219/69 E |
| 3,333,050 | 7/1967 | Humphrey et al. ............. | 427/119 |
| 4,287,404 | 9/1981 | Convers et al. .............. | 219/69 W |
| 4,341,939 | 7/1982 | Brifford et al. ............. | 219/69 W |

FOREIGN PATENT DOCUMENTS 0712223  1/1980  U.S.S.R. ................. 219/69 W

Primary Examiner—Winston A. Douglas
Assistant Examiner—Terryence Chapman
Attorney, Agent, or Firm—Karl F. Ross; Herbert Dubno

[57] ABSTRACT

An improved machining method and electrode for use in the traveling-wire EDM process utilizing an aqueous machining fluid medium which is decomposed by erosive electrical discharges into gaseous oxygen and hydrogen. Breakage of the traveling-wire electrode is reduced or eliminated through the use of an improved electrode element comprising a continuous electrode wire substrate and a layer of a polymeric substance having a temperature of thermal decomposition of 100° to 500° C. attached thereto in a distributed manner such as to partially cover the surface of the substrate. The improved electrode element traveling in machining juxtaposition with the workpiece is subjected to the electrical discharges to cause a thermal decomposition of the polymeric substance to form carbon and to allow the gaseous oxygen and hydrogen at least partially to be chemically combined therewith and to reduce the amount of the oxygen gases in the machining gap which tend to cause a continuous arc discharge or explosion as a cause of the wire breakage. The improved elongate element should preferably contain a hydrogen active catalytic metal, e.g. Li, Cs or Sm, having a spectrographic wavelength of 300 to 600 nm to facilitate chemical reaction of carbon with oxygen and hydrogen in the gap.

13 Claims, 4 Drawing Figures

TRAVELING-WIRE EDM METHOD

FIELD OF THE INVENTION

The present invention relates to a new and improved traveling-wire EDM (electrical-discharge-machining) method utilizing an improved elongate element which constitutes the continuous "wire" electrode in the traveling-wire EDM system, and to such an elongate, continuous electrode element of novel design for electroerosively machining an electrically conductive workpiece. The term "wire" electrode is used herein to refer to a continuous, thin, elongate electrode in the form of a wire, or narrow band or ribbon and composed of an electrically conductive electrode material.

BACKGROUND OF THE INVENTION

In the traveling-wire electroerosion system, a continuous wire electrode is axially transported by a wire axial drive means from a supply means to a takeup means. In the path of wire travel between the supply and takeup means, a pair of guide members are disposed at opposite sides of the workpiece to provide a straight line path along which the wire electrode is to travel axially to traverse the workpiece in spaced juxtaposition and precise machining relationship therewith across the machining gap. Tension means is commonly provided to span the wire electrode tightly across the guide members and thereby assures that it travels taut precisely along the said straight line path.

Means is also provided to keep the machining gap flooded with a machining fluid which is essentially of dielectric nature or low conductivity. When an output voltage from an EDM power supply is developed across the gap between the traveling-wire electrode and the workpiece, the fluid filling the gap is broken down to cause an impulsive electrical discharge therethrough, thereby electroerosively removing stock from the workpiece and also material from the wire electrode. The erosive wear of the wire electrode is compensated for by virtue of the continuous travel thereof through the machining gap and the consequent continuous renewal of the machining surface. The EDM power supply is adapted to apply a succession a machining voltage pulses across the machining gap to intermittently produce such electrical discharge, thereby continuing the stock removal from the workpiece. As the stock removal continues, the workpiece is displaced relative to the traveling wire electrode transversely to the longitudinal axis thereof or the aforesaid straight line path. The relative displacement is effected along a prescribed contouring path, typically under commands of a numerical controller (NC) so that a desired contour of cut is generated in the workpiece.

A typical example of the machining fluid which constitutes the discharge medium in the traveling-wire machining system is a deionized aqueous fluid, e.g. water from the municipal supply or tap deionized through an ion-exchange cartridge so that it has an electrical resistivity generally on the order of $10^3$ to $10^5$ ohm-cm and becomes dielectric in nature. The water fluid has been advantageously employed because of its ready availability and nonflamability in the traveling-wire EDM system. The water fluid has also good cooling ability to dissipate heat developed in the gap regions due to the machining electrical discharges.

In order to assure high cutting accuracy, the traveling wire electrode must be very thin or slender. Customarily, a copper or brass wire of a thickness or diameter as small as 0.05 to 0.5 mm has been employed. The "wire" is customarily circular in cross section but may be of any other cross sectional shape, and may be of a narrow band, taper or ribbon. Copper or brass wire materials have been found to be generally satisfactory because of their relatively high electrical and thermal conductivities in addition to reasonable toughness.

One of major problems in the traveling-wire EDM art is the problem of breakage of the wire electrode which is as thin as mentioned above. It has been recognized that when the electrode wire is excessively heated or insufficiently cooled, the wire tends to break. This is especially true when higher amperage or current density is employed in an attempt to achieve a higher removal rate and cutting speed. Prior efforts in the art to avoid wire breakage have been concentrated on dissipating the discharge heat as quickly and efficiently as possible, say, by using an increased rate of travel of the wire electrode or increase rate of supply of the machining fluid into the gap, but with only limited success. As a consequence, there has been an unsatisfactory limit of the machining current which can be delivered to the machining gap to increase the cutting speed and enhance the machining efficiency. When one attempts to exceed such limit, the wire tends to break.

I have now observed that the phenomenon of wire breakage in the conventional traveling-wire EDM process is, apart from the apparent discharge heat or apparent thermal parameters of electrical discharges, largely related to the generation of gases as a result of decomposition of the aqueous machining fluid in the EDM gap. It has been observed that the aqueous fluid or water supplied into the gap to serve as the discharge medium is decomposed by the electrical discharges thermally, possibly also electrolytically, to form gases which contain mainly hydrogen and the balance oxygen. These gases are triggered by the electrical discharge to cause explosions which involve the creation of intense pressure and heat, which appear to cause breakage of the wire electrode. The higher the machining current delivered, the greater is the amount of gas generated and hence the greater are the generated pressure and heat so that the traveling wire electrode is more easily broken.

OBJECTS OF THE INVENTION

It is, accordingly, a principal object of the present invention to provide a new and improved traveling-wire EDM method which renders the wire electrode less susceptible to breakage.

Another important object of the present invention is to provide a new and improved method of the type described which allows a greater machining current to be delivered to increase cutting speed, without the fear of wire breakage.

A further important object of the present invention is to provide a new and improved continuous elongate element adapted to constitute a traveling-wire electrode for use in the traveling-wire EDM system and which has less tendency to break in such an EDM system.

Still another object of the present invention is to provide a continuous elongate element of the type described which is less liable to break while carrying a greater machining current for delivery to the cutting gap.

SUMMARY OF THE INVENTION

It has now been discovered that the gases inherently generated by the decomposition of an aqueous machining fluid in the machining gap in the traveling-wire EDM system to cause breakage of the wire electrode are substantially made ineffective when the wire electrode is provided with a polymeric substance partially disposed thereon, the substance, when subjected to the electrical discharges, being capable of decomposition to generate carbon and to allow at least a portion of the gaseous oxygen and hydrogen to be combined therewith. The polymeric substance should, preferably, have a temperature of thermal decomposition ranging between 100° and 500° C.

In accordance with the present invention there is provided in a first aspect thereof a method of machining a workpiece, wherein an electrically conductive, continuous elongate element is axially transported from a supply side to a takeup side to form a traveling-wire machining electrode traveling continuously while being spanned taut between the said sides and juxtaposed with the workpiece across a machining gap, an aqueous fluid medium is supplied to the machining gap, a machining voltage is intermittently applied across the traveling electrode and the workpiece to effect through the gap a succession of electrical discharges which electroerosively remove stock from the workpiece and cause decomposition of at least a portion of the supplied aqueous fluid medium to form gases of oxygen and hydrogen in the machining gap, and the workpiece is displaced relative to the traveling-wire electrode transversely to the axis thereof along a predetermined path to machine the workpiece, the method including the steps of: (a) attaching a polymeric substance to the said electrically conductive, continuous elongate element so as to partially cover the surface thereof; and (b) subjecting the elongate element traveling in machining juxtaposition with the workpiece to the electrical discharges to thermally decompose the said attached polymeric substance at least partly to form carbon and causing at least a portion of said gaseous oxygen and hydrogen to be chemically combined therewith to control the amount of these gaseous components in the machining gap.

A polymeric substance can be generally satisfactory having a temperature of thermal decomposition ranging between 100° and 500° C. An example of a suitable polymeric substance is polyvinylbutylal.

The polymeric substance may be attached to the electrically conductive, continuous elongate element e.g. in the form of a continuous band spirally arranged, or an array of discrete rings of bands formed periodically or aperiodically over a continuous length of the elongate element. The spiral band or each of the discrete bands or rings preferably has a width of, say, 0.5 mm and is spaced from an adjacent band portion, or adjacent discrete band or ring by, say, 1 mm. The attached layer of the polymeric substance preferably has a thickness of, say, 0.01 mm. With the thickness or diameter of the electrically conductive, continuous elongate element, which may be of any conventional traveling-wire EDM electrode material such as copper or a copper alloy of a thickness 0.05 to 0.5 mm, it has been found to be generally satisfactory that the continuous band or each discrete band or ring has a width of 0.05 to 2.0 mm, a spacing of 0.1 to 2.0 mm and a thickness of 0.001 to 0.05 mm. Alternatively, the layer of the polymeric substance attached may be in the form of one or more spaced, parallel bands extending in the direction of the longitudinal axis of the electrically conductive, continuous elongate element.

Preferably, the electrically conductive, continuous elongate element further has at least one of hydrogen active metal catalysts, such as lithium (Li), cesium (Cs) and samarium (Sm), contained therein which has a spectrographic wavelength of 300 to 600 nm (nanometers). Such a metal catalyst may be contained either in the attached layer of the polymeric substance or in the electrically conductive substrate of the elongate element. It has been found that such a catalytic metal can be advantageously added to facilitate the chemical combination of decomposition-generated carbon with gaseous hydrogen and also with gaseous oxygen.

The method according to the present invention effectively controls the amount of gaseous oxygen and hydrogen in the machining gap which, when ignited by an electrical machining discharge, cause an intense pressure and heat entailing explosion so that the traveling-wire electrode can be rendered less liable to break, thereby increasing the efficiency of the traveling-wire EDM process.

The invention also provides in a second aspect thereof an improved electrically conductive, continuous elongate element for use as a traveling-wire machining electrode for use in a wire-cutting EDM process in which the traveling-wire machining electrode is axially transported from a supply side to a takeup side to travel continuously while being spanned taut across the same sides and juxtaposed with a workpiece across a machining gap, an aqueous fluid medium is supplied to the machining gap, a machining voltage is intermittently applied across the traveling electrode and the workpiece to effect through the gap a succession of electrical discharges which electroerosively remove stock from the workpiece and cause decomposition of at least a portion of the supplied aqueous fluid medium to form gases of oxygen and hydrogen in the machining gap, and the workpiece is displaced relative to the traveling-wire electrode transversely to the axis thereof along a predetermined path to machine the workpiece, the elongate element comprising an elongate substrate of an electrically conductive electrode material and a layer of a polymeric substance attached thereto in a distributed manner such as to partially cover the surface thereof, the polymeric substance being, when subjected to the electrical discharges, capable of being thermally decomposed at least partly to form carbon and to allow at least a portion of the gaseous oxygen and hydrogen to be chemically combined therewith to control the amount of the oxygen and hydrogen gases in the machining gap. Preferably, the electrically conductive, continuous elongate element further has at least one of hydrogen active catalytic metal, such as lithium (Li), cesium (Cs) and samarium (Sm), contained therein which has in its spectograph a band of a wavelength of 300 to 600 nm (nanometers). Such a metal catalyst may be contained preferably in the attached layer of the polymeric substance but may also or alternatively be in an electrically conductive substance of the elongate element.

BRIEF DESCRIPTION OF THE DRAWING

Various preferred embodiments of the present invention will now be described, by way of example only, with reference to the accompanying drawings in which.

SPECIFIC DESCRIPTION

Figure 1:
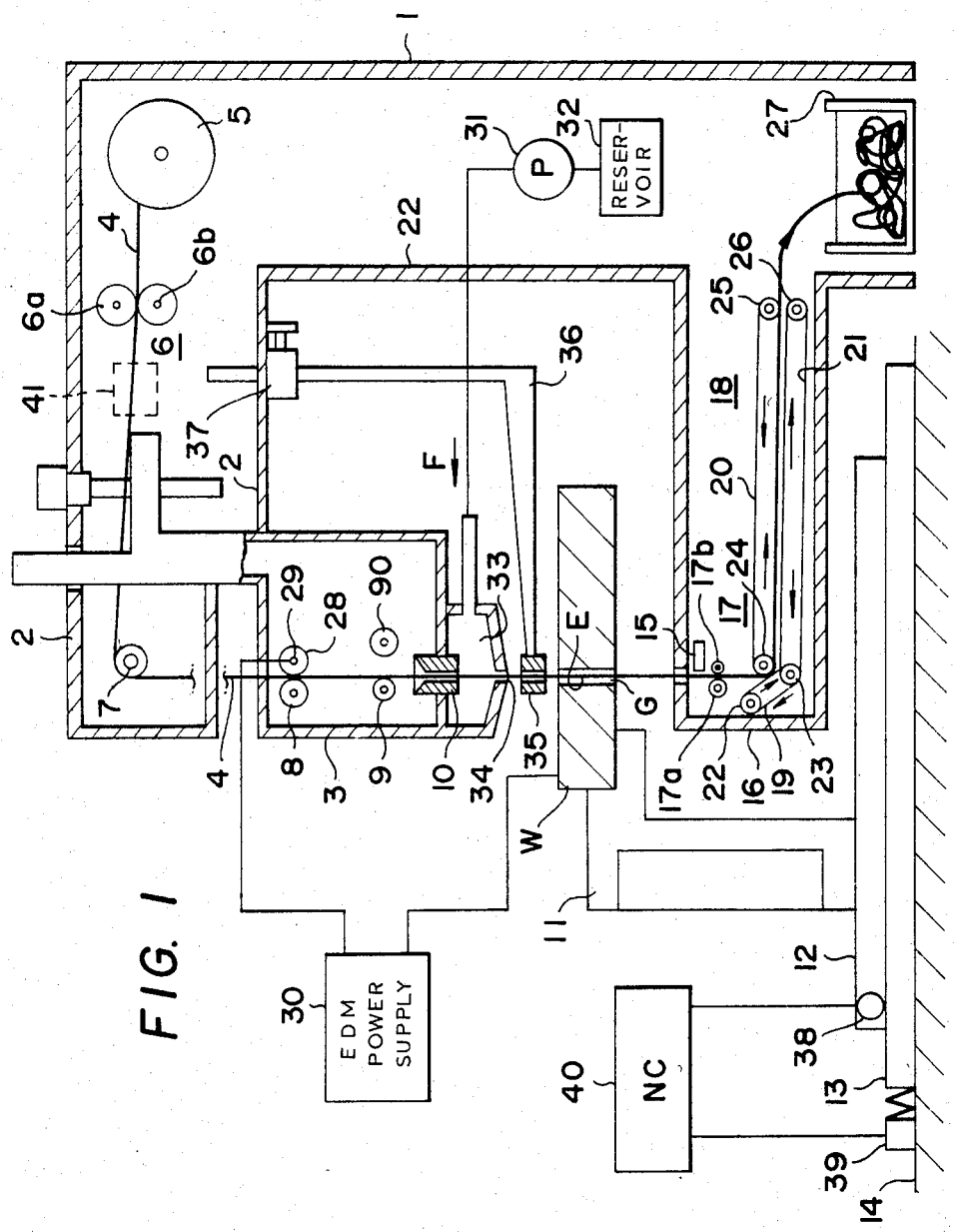
FIG. 1 is an elevational view, essentially in section, diagrammatically illustrating a typical traveling-wire electroerosion machining apparatus with which the improved machining electrode formed by a said elongate element may be employed and the method according to the invention may be practiced.

Referring now to FIG. 1, a traveling-wire electroerosion machine of typical design is shown comprising a vertical column 1 formed with an upper horizontal extension 2. A machine head 3 is slidably carried by the horizontal extension 2, and is vertically displaceable by a motor for adjustment of its vertical position. An electrically conductive, continuous elongate element 4 constituting a traveling-wire machining electrode E according to the invention is stored in a supply reel 5 mounted at an upper site in the column 1, and is guided via brake rollers 6a, 6b and a guide roller 7 in the horizontal extension 2 and then via guide rollers 8, 9 and a guide member or die guard 10 in the head towards the region of a workpiece W, which is securely mounted on a work stand or table 11. The latter is carried on a cross-slide table arrangement 12, 13 which is in turn carried on a base 14 of the machine. The wire electrode E is positioned in a machining relationship with the workpiece W by and between the die guide 10 located on the upper side of the workpiece in the head 3 and a slide guide 15 located on the lower side of the workpiece in a hollow arm 16 which extends horizontally from the vertical column 1 beneath the workpiece W. A wire drive unit 17 is diposed below the slide guide 15 within the hollow arm 16, and is constituted by a pair of abutting rollers 17a and 17b one of which is driven by a motor (not shown) to give a continuous traction to the wire electrode E. Further shown arranged in the arm 16 is a wire pull-out system 18 comprising three endless belts 19, 20 and 21 wound on pairs of rollers: 22 and 23; 24 and 25; and 23 and 26, respectively. In this arrangement, the rollers 23 and 24 may be driven by a motor or motors (not shown) to move these belts and to seize the wire electrode E first between the moving belts 19 and 20 and then between the moving belts 20 and 21. The wire electrode E emerging from between the moving belts 20 and 21 is collected in a collection box 27.

Against the traction force exerted on the wire electrode E by the drive rollers 17a and 17b downstream of the workpiece W, the brake rollers 6a and 6b on the wire supply side are driven so as to apply an appropriate braking force to the wire electrode E so that the continuous elongate element 4 continuously travels from the supply reel (5) to the collection box (27) at an appropriate rate of axial travel and under an appropriate tension. The guide roller 7 and the pull-out unit 18 serve to change the direction of wire travel from the supply side to the workpiece W and from the latter to the takeup side or collection box 27, respectively. Downstream of the direction changing guide roller 7, an electrically conductive roller 28 is disposed in an abutting relationship with the guide roller 8 to conduct the electroerosion current to the wire electrode E and is thus connected via a brush 29 to one output terminal of an EDM power supply 30 which has its other output terminal electrically connected to the workpiece W via a conducting block (not shown). An output machining voltage from the power supply 30 is thus intermittently applied across the machining gap G formed between the traveling electrode E and the workpiece in the presence of an aqueous machining fluid F, e.g. deionized water having an electrical resistivity ranging between $10^3$ and $10^5$ ohm-cm. A pump 31 draws the machining fluid from a reservoir 32 to furnish it to a plenum chamber 33 attached to the head 3 and dependent from its lower end and formed with a fluid delivering nozzle opening 34. The fluid F pumped into the chamer 33 is supplied through the opening 34 onto the traveling wire electrode E and carried into the machining gap G therewith. A tubular electromechanical transducer 35 may be disposed so as to allow the wire electrode E to pass therethrough. When energized by a power supply (not shown), this transducer imparts a high-frequency mechanical vibration to the traveling wire electrode E so as to facilitate en electroerosion process. The transducer 35 is shown as supported on the horizontal extension 2, and its vertical position is adjusted by a position adjustment unit 37.

The cross-slide table arrangement 12 and 13 carrying the work stand 11 is driven in an X-Y plane, by means of an X-axis motor 38 and a Y-axis motor 39 drivingly coupled therewith, respectively. The motors 38 and 39 are energized with X-axis and Y-axis drive signals furnished from a numerical-control (NC) unit 40 to displace the workpiece W relative to the longitudinal axis of the wire electrode E to establish a given relative 'machining-start' position preprogrammed in the NC unit 40 and then to displace the workpiece W relative to the axis of the traveling wire electrode E along a prescribed cutting path also preprogrammed in the NC unit 40. As the electroerosive stock removal from the workpiece W continues, the workpiece W is displaced relative to the traveling electrode E along this path to machine the workpiece W.

The electroerosive stock removal from the workpiece W is effected by a succession of electrical discharges which are produced through the machining gap G as the machining voltage is intermittently applied across the traveling electrode E and the workpiece W from the EDM power supply 30. The erosion electrical discharges cause decomposition of the aqueous machining fluid F to form gaseous oxygen and hydrogen in the machining gap G. It has been observed that these gases may be ignited by the electrical discharges to cause a continuous arc discharge or explosion which entails intense pressure and heat. The continuous arc discharge and the explosion are quite often causes of the breakage of the traveling electrode wire E.

This problem is overcome according to the present invention by utilizing an improvement in the electrically conductive, continuous elongate element 4 which has a layer of a polymeric substance attached thereto in a distributed manner such as to partially cover the surface thereof. It is essential that the surface of the elongate element 4 has continuous or discontinuous exposed portions not covered with the polymeric substance.

The polymeric substance can be any polymeric substance which has a temperature of thermal decomposition of 100° to 500° C. Examples of the solid polymeric substance include polyvinyl butylar, polyvinyl acetal, polyvinyl alcohol and polyvinyl acetate. The attached polymeric substance, when subjected to the electrical machining discharge, is thermally decomposed to yield carbon which is chemically combined with a portion of gaseous oxygen and hydrogen to control or reduce the amount of the latter gases in the machining gap G.

Figure 2A:
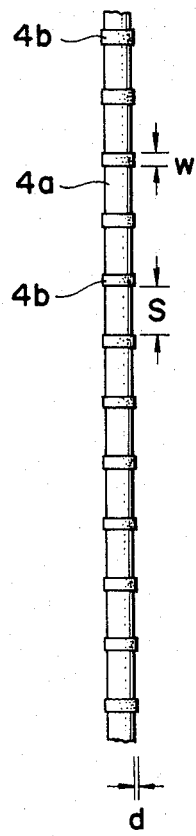
FIGS. 2(a), 2(b) and 2(c) are longitudinal views diagrammatically illustrating typical embodiments of the improved elongate element according to the invention.
Figure 2B:
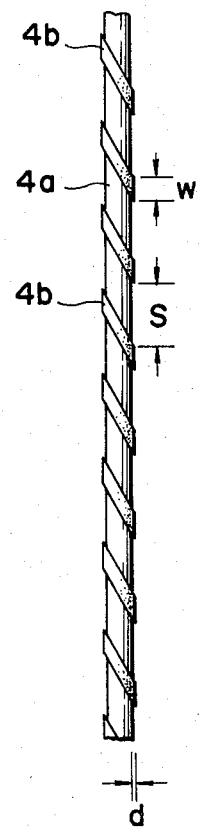
Figure 2C:
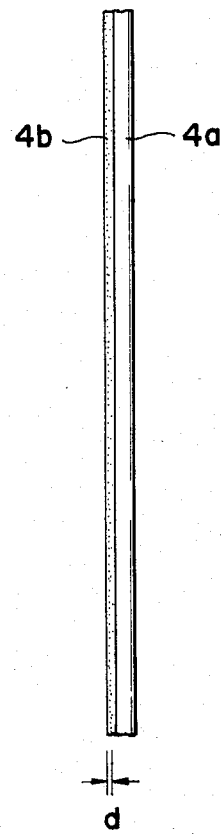

FIGS. 2(a), 2(b) and 2(c) show typical examples of the improved electrically conductive, continuous elongate element 4, which is constituted by an electrode substrate 4a composed of any conventional traveling-wire electrode material such as copper or brass and a layer of the polymeric substance 4b attached, e.g. by an adhesive or printing, to the substrate 4a in a distributed manner such as to partially cover the surface of the substrate 4a. The electrode substrate 4a is conveniently a wire of circular cross section and advantageously has a diameter of 0.05 to 0.5 mm and, preferably, 0.09 to 0.5 mm.

In FIG. 2(a), the layer 4b of polymeric substance comprises an array of parallel rings or bands which have a given width W ranging between 0.05 and 2.0 mm and are spaced from one another with a spacing s ranging between 0.1 and 2.0 mm. In FIG. 2(b), the layer 4b is a continuous band spirally formed on the substrate 4a having a width w again ranging between 0.05 and 2.0 mm and having each band portion spaced from the adjacent band portions with a spacing s ranging between 0.1 and 2.0 mm. In FIG. 2(c), the layer 4b is a straight band formed on the substrate 4a parallel with the longitudinal axis of the wire substrate 4a and having a width of 0.01 to 2.0 mm. More than one such band or strip spaced in parallel with one another may be attached to the wire substrate 4a. In the arrangements of FIGS. 2(a), 2(b) and 2(c), the attached layer 4b generally has a thickness d ranging between 0.001 and 0.05 mm.

While a preformed elongate element 4 having a layer of a polymeric substance 4b partially attached previously on the metal wire substrate 4a may be stored on the supply reel 5 and fed directly to the cutting zone to serve the improved traveling-wire electrode E, the element 4 stored on the supply reel 5 may be in the form of a conventional commercially available wire electrode. A coating stage 41 may be provided upstream of the cutting zone W, G to uniformly coat the surface of the elongate element 4 with a polymeric substance. The guide member 10 may then be a die guide adapted to mechanically strip the coating of the polymeric substance from the surface of the traveling elongate element 4 to yield, for passage into the cutting zone W, G, the improved traveling electrode E of a pattern of the attached layer as shown in FIGS. 2(a), 2(b) or 2(c), or a modification thereof. Alternatively, a conventional electrode wire previously coated fully with a polymeric substance is stored on the supply reel 5 and the die guide 10 used to partially strip the coating on the wire surface to yield the improved traveling electrode E according to the invention.

According to the present invention the improved traveling-wire machining electrode E traveling in machining juxtaposition with the workpiece W is subjected to the erosive electrical discharges to cause thermal decomposition of the polymeric substance 4b to form carbon and to allow at least a portion of the gaseous oxygen and hydrogen to be chemically combined therewith, thereby controlling the amount of these gases in the machining gap G. In this manner, the machining electrode is rendered less liable to break and the machining efficiency is largely increased.

Preferably, a hydrogen active catalytic metal such as Li, Cs or Sm is contained in the improved elongate element 4. Such a metal having a spectrographic wavelength ranging between 300 to 600 nm has been found to be generally effective to promote reactions of carbon with hydrogen and oxygen. The catalytic metal can be contained in the layer of polymeric substance 4b attached to the wire metal substrate 4a. An amount of 0.1 to 3% by weight of the catalytic metal contained has been found to be generally satisfactory and suitable.

According to the present invention, the traveling-wire machining electrode E is effectively prevented from excessive heating and mechanical stresses due to the discharge generated gaseous hydrogen and oxygen and is thus rendered less liable to break. It has been found that greater machining current than is possible with the conventional wire electrode can be delivered to the improved wire electrode having the same thickness to allow greater machining rate and efficiency to be attained.

EXAMPLE

In the traveling-wire EDM machining of a workpiece composed of S55C (Japanese Industrial Standard) carbon steel and having a thickness of 10 mm with deionized water of an electrical resistivity of $2 \times 10^4$ ohm-cm, a conventional copper electrode wire of 0.2 mm in diameter is broken when the average machining current is increased over 5.5 amperes. An improved copper electrode wire of the same diameter but embodying the invention and coated with polyvinyl butylal in a pattern of FIG. 2(B) with the width (w) of 0.5 mm, a spacing (s) of 1 mm and thickness (d) of 0.01 mm withstands the maximum average machining current of 9.0 amperes without breakage. As a result, the improved wire electrode allows a 1.6 fold increase of the cutting speed.

What is claimed is:

1. A method of machining a workpiece wherein an electrically conductive, continuous elongate element is axially transported from a supply side to a takeup side to form a traveling-wire machining electrode traveling continuously while being spanned taut across said sides and juxtaposed with the workpiece across a machining gap, an aqueous fluid medium is supplied to said gap, a machining voltage is intermittently applied across the traveling electrode and the workpiece to effect through the gap a succession of electrical discharges which electroerosively remove stock from the workpiece and cause decomposition of at least a portion of said aqueous fluid medium to form gases of oxygen and hydrogen in said gap, and said workpiece is displaced relative to the traveling-wire electrode transversely to the axis thereof along a predetermined path to machine the workpiece, the method including the steps of:
    (a) attaching a polymeric substance to said electrically conductive, continuous elongate element so as to partially cover the surface thereof; and
    (b) subjecting said elongate element traveling in machining juxtaposition with said workpiece to said electrical discharges to thermally decompose said polymeric substance, at least partly to form carbon and causing at least a portion of said gaseous oxygen and hydrogen to be chemically combined therewith to control the amount of these gaseous components in said machining gap.

2. The method defined in claim 1 wherein said polymeric substance has a temperature of thermal decomposition ranging between 100° and 500° C.

3. The method defined in claim 1 or claim 2 wherein said elongate element contains a hydrogen active catalytic metal, which has a spectrographic wavelength of 300 to 600 nm.

4. The method defined in claim 3 wherein said catalytic metal is contained in an amount of 0.1 to 3% by weight.

5. The method defined in claim 3 wherein said catalytic metal is contained in said polymeric substance.

6. The method defined in claim 3 wherein said catalytic metal is contained in the electrically conductive substrate constituting said elongate element.

7. The method defined in claim 3 wherein said catalytic metal includes at least one metal selected from the group consisting of lithium, cesium and samarium.

8. The method defined in claim 1 wherein said polymeric substance is attached to the elongate element in the pattern of a substantially parallel running, substantially continuous spiral band around said elongate element.

9. The method defined in claim 1 wherein said polymeric substance is attached to the elongate element in the pattern of substantially parallel, interspaced bands around said elongate element.

10. The method defined in claim 1 wherein said polymeric substance is attached to the elongate element in the pattern of one or more bands extending longitudinally of said elongate element.

11. The method defined in claim 8, claim 9 or claim 10 wherein said elongate element has a thickness of 0.05 to 0.5 mm and said attached polymeric substance has an attached band width of 0.05 to 2.0 mm and an inter-band spacing of 0.1 to 2.0 mm.

12. The method defined in claim 11 wherein said polymeric substance has an attached thickness of 0.001 to 0.05 mm.

13. The method defined in claim 1, further comprising, coating fully said continuous elongate element with a layer of said polymeric substance, advancing axially the coated continuous elongate element towards said workpiece and, prior to entry into said workpiece, stripping portions of said coated layer from said elongate element to yield the partially covered surface thereof.

* * * * *

UNITED STATES PATENT AND TRADEMARK OFFICE
CERTIFICATE OF CORRECTION

PATENT NO. : 4,508,604
DATED : 2 April 1985
INVENTOR(S) : Kiyoshi INOUE

It is certified that error appears in the above-identified patent and that said Letters Patent is hereby corrected as shown below:

On the title page;
In the heading, left column, item [30], the Foreign Application Priority date should read:

-- March 25, 1982 --.

Signed and Sealed this

Thirteenth Day of August 1985

[SEAL]

Attest:

DONALD J. QUIGG

Attesting Officer     Acting Commissioner of Patents and Trademarks